3,281,294
METHOD FOR ETCHING GLASS

Francis W. Martin, Painted Post, N.Y., assignor to Corning Glass Works, Corning, N.Y., a corporation of New York
No Drawing. Filed June 8, 1965, Ser. No. 462,441
4 Claims. (Cl. 156—24)

The present invention relates to a new method for etching glass.

Conventional methods for etching glass surfaces include sandblasting and treating the surface of the glass body which is to be etched with fluoride solutions. These methods are attended by certain difficulties, such as weakening of the glass structure and the production of non-uniform, coarse-grained, etch patterns. In addition, the portions of the glass etched by conventional techniques have proved to be very difficult to clean due to the presence of irregular, cracked pits.

Accordingly, it is an object of the present invention to provide a new method for etching glass surfaces which produces a uniform, easily cleaned, finely-grained etch pattern and which does not weaken the glass structure.

In general, the present invention comprises applying to a glass substrate a frit of a sealing glass which undergoes thermal devitrification when it is fused or matured. The frit is then heated until it is fused and devitrified and is cooled to form a glaze on the surface of the substrate. Next, the glaze is removed to develop an etched pattern on the surface of the glass. The etch pattern is characterized by uniform, smooth pits which form an easily cleaned, matte finish on the substrate.

The invention is based on several discoveries. First, it has been observed that, during thermal maturing, many sealing glasses have a tendency to react with the surface of the glass body on which they are applied. It has also been observed that by devitrifying the sealing glass layer, a differential attack on the glass substrate may be obtained. This is possibly due to a blocking action by the crystals which are formed during devitrification and which prevent attack by the glassy phase of the frit on the glass substrate.

Since it has been observed that the depth of the etch increases with an increase in the time and temperature at which the sealing glass is matured and devitrified, the present method also provides the opportunity for exercising close control over the depth of the etch.

The general requirements for the soft glass etchant is that it be capable of undergoing substantially uniform thermal devitrification, as more fully described in U.S. Patent 2,889,952, Claypoole, issued June 9, 1959 having a composition of 71.5–80% PbO, 10–15% ZnO, 6.5%–10% $B_2O_3$ and 1–3% $SiO_2$. Thermally devitrifiable sealing glasses of the type described in my U.S. Patent 3,113,878, issued December 10, 1963, having the composition of 60–70% ZnO, about 19–25% $B_2O_3$ and about 10–16% $SiO_2$ glass are also satisfactory. Upon being fused, such sealing glasses precipitate a crystalline phase which is substantially uniformly dispersed throughout a glassy phase matrix. The vitreous or glassy phase of the fused frit interacts with the surface of the glass to which it is applied to form reaction products. After the fused frit is cooled to form a glaze on the surface of the substrate, the glaze together with the interfacial reaction products are removed, for example, by being dissolved in a suitable solvent, such as a dilute acid solution, to develop the etch pattern.

Generally, any glass substrate may be etched by the present method provided that it is stable at the temperature at which the etching frit is matured and is not itself rapidly attacked by the solution used to remove the matured frit and to develop the etch pattern. Such glasses include, for example, borosilicate, aluminosilicate, potassium-lead-silicate, fluoride opal, "Pyrex," 96% silica, opal-white, opaque ceramics and many other special glasses having unique electrical, chemical, thermal, optical and photosensitive properties.

The following are illustrative examples of the practice of the present invention which will provide a better understanding of the principles involved.

Example I

A thermally devitrifiable sealing glass having the following composition on an oxide basis is melted, quenched and ground to a fine powder:

| Oxide: | Percent by weight |
| --- | --- |
| PbO | 76.5 |
| ZnO | 11.0 |
| $B_2O_3$ | 9.0 |
| $SiO_2$ | 2.5 |
| $Al_2O_3$ | 1.0 |

The powder is mixed with water to form a suspension and is applied by silk screening to selected portions of the surface of a commercial chemical resistant borosilicate glass substrate which is to be etched. The deposited frit is then heated to a temperature of about 500° C. for about an hour to mature the frit and form an adherent layer of uniformly devitrified sealing glass on the surface of the substrate. The coated glass is then cooled and the layer of sealing glass or glaze is removed by washing with a 3 N solution of nitric acid. A finely grained, easily cleaned, etch pattern is thus formed on the surface of the borosilicate glass substrate.

Example II

A thermally divitrifiable sealing glass having the following composition on an oxide basis is melted, quenched and ground to a fine powder:

| Oxide: | Percent by weight |
| --- | --- |
| PbO | 71.5 |
| ZnO | 15.0 |
| $B_2O_3$ | 7.5 |
| $Al_2O_3$ | 3.5 |
| $SiO_2$ | 2.5 |

The soft sealing glass is suspended in water and applied uniformly over the surface of a piece of commercial opal glass. The frit is then fused and devitrified by heating to about 500° C. for about 30 minutes. The fused frit is cooled to form a glaze and is removed by being dissolved in a 3 N nitric acid solution to develop a finely grained, easily cleaned, matte finish on the surface of the opal glass.

It will be apparent that the sealing glass etchant may be applied to the glass substrate in a variety of ways, such as by spraying, dipping or silk screening.

As previously mentioned, the temperature at which the etching frit is matured will affect the etching depth. The higher the temperature, the deeper will be the etch. There are no rigid temperature limits for this procedure. The lowest useful temperature is that temperature at which the frit will mature and devitrify. The maturing temperature for a frit is the temperature at which it fuses and wets the substrate. This temperature depends on the composition of the specific etching frit. The upper temperature limit is ordinarily dictated by the nature of the substrate. It is undesirable to approach a temperature at which the glass will warp or become distorted. Although the practice of the invention is not limited to a specific temperature range for maturing the frit, temperatures of from about 400° to over 600° C. are normally employed.

The depth of etch is also dependent upon the period of time over which the frit is heated, deeper etching being produced by longer heating periods. While the invention is not limited to a definite time period, heating of the frit at maturing temperatures for a period of from a few minutes to an hour or more is satisfactory.

The frit may be removed from the glass substrate and the etch pattern developed in any suitable manner. The preferred method comprises treating the coated glass base with a solvent which selectively dissolves the matured frit and the reaction products formed between the glassy phase of the frit and the substrate at their interface. Aqueous solutions of mineral acids, such as nitric acid, are useful for this purpose.

This process may be used to etch graduations, letters, designs and decorations by selective application to various glass bases, as well as to produce uniform matte finishes by application over the entire surface of a glass substrate.

It will be obvious to those skilled in the art that the present invention may be practiced by using many different combinations of etching frits, glass substrates, solvents and processing conditions without departing from the scope of the invention as expressed in the following claims.

What is claimed is:
1. A method for etching glass surfaces which comprises
    (a) coating selected areas of the glass to be etched with a frit consisting of a sealing glass which, upon being fused, precipitates a fine-grained crystal phase uniformly dispersed in a glassy matrix upon said glass surfaces, said sealing glass being selected from the group consisting of zinc-borosilicate glasses consisting essentially, by weight, of about 60–70% ZnO, 1–16% $SiO_2$, and 19–25% $B_2O_3$, and lead-zinc-borosilicate glasses consisting essentially, by weight, of about 71.5–80% PbO, 10–15% ZnO, 6.5–10% $B_2O_3$, and 1–3% $SiO_2$,
    (b) fusing said frit at a temperature which will at least mature and devitrify said frit and for a sufficient time to produce the required depth etch pattern by producing a devitrified glaze bonded to the glass surface,
    (c) cooling the glazed surface reaction product, and
    (d) thereafter essentially completely dissolving said devitrified glaze reaction product and any other reaction products formed at the interface between said devitrified glaze and the glass surface by a solvent solution therefor to develop an etch pattern on the surface of the glass.
2. The method of claim 1 wherein said glaze and said reaction products are dissolved in a nitric acid solution.
3. The method of claim 1 wherein said substrate is a chemical resistant borosilicate glass.
4. The method of claim 1 wherein the dissolving agent for removing the reaction products is one that does not attack the substrate.

References Cited by the Examiner
UNITED STATES PATENTS

| | | | |
|---|---|---|---|
| 2,220,862 | 11/1940 | Blodgett | 65—31 |
| 2,286,275 | 6/1942 | Hood et al. | 65—31 |
| 2,315,329 | 3/1943 | Hood et al. | 65—33 |
| 3,113,878 | 12/1963 | Martin | 106—54 |

ALEXANDER WYMAN, *Primary Examiner.*

JACOB STEINBERG, *Examiner.*